United States Patent Office

3,058,963
Patented Oct. 16, 1962

3,058,963
PROCESS FOR POLYMERIZING OLEFINS
Edwin J. Vandenberg, Wilmington, Del., assignor to Hercules Powder Company, Wilmington, Del., a corporation of Delaware
No Drawing. Filed Apr. 7, 1955, Ser. No. 500,041
26 Claims. (Cl. 260—88.2)

This invention relates to an improved process for polymerizing olefins alone or in admixture with other olefins whereby it is possible to carry out the polymerization at atmospheric or only slightly elevated pressures and at relatively low temperatures and obtain polymers and copolymers exhibiting unusual properties.

In Belgian Patents Nos. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV-B, V-B, VI-B or VIII of the periodic table, or manganese, in combination with an organometallic compound of an alkali metal, alkaline earth metal, zinc, earth metal (especially aluminum), or rare earth metal. The usual procedure for carrying out such a process is to mix the two catalyst components in a hydrocarbon solvent and then pass ethylene into the catalyst mixture at atmospheric or slightly elevated pressure and at room temperature or moderately elevated temperatures. It has been suggested that a reduction of the tetravalent titanium or other transition metal occurs on admixture with the organoaluminum compound to produce a mixture of lower valence compounds, but the mechanics of the reaction are not known. That a reaction has taken place is generally evidenced by the formation of a colored, usually brown to black, precipitate on admixture of the two reactants.

Now, in accordance with this invention, it has been found that greatly improved polymerization results may be obtained by using a two-component catalyst system comprising (1) the hydrocarbon-insoluble reaction product obtained in the above-mentioned Ziegler catalyst preparation and separated from the hydrocarbon-soluble phase and (2) an organometallic compound of a metal from the group of alkali metals, alkaline earth metals, zinc, earth metals, and rare earth metals. By utilizing this two-component catalyst it is possible to polymerize ethylenically unsaturated hydrocarbons under mild conditions of temperature and pressure more effectively and realize many other advantages, such as improved rate of polymerization and space-time yields, use of lower catalyst concentrations, etc. Of particular importance, especially for the more readily polymerized olefins such as ethylene and propylene, is the fact that under any given set of conditions the molecular weight of the polymer may be more effectively controlled.

The hydrocarbon-insoluble reaction product catalyst component used as one of the catalyst components in the process of this invention is readily prepared by simply mixing the defined metal compound of the designated groups of the periodic table with the organometallic compound of the selected metal and then separating the hydrocarbon-insoluble component that is formed. As already pointed out, the transistion metal compound may be a compound of any metal of groups IV-B, V-B, VI-B or VIII of the periodic table, i.e., titanium, zirconium, hafnium, thorium, vanadium, columbium, tantalum, chromium, molybdenum, tungsten, uranium, iron, cobalt, nickel, etc., or manganese. The compound may be an inorganic salt such as a halide, oxyhalide, etc., or an organic salt or complex such as an acetylacetonate, etc. Exemplary of such compounds are titanium and zirconium tetrachloride, manganous chloride, nickelous chloride, ferrous chloride, ferric chloride, tetrabutyl titanate, zirconium acetylacetonate, vanadium oxy acetylacetonate, chromium acetylacetonate, etc. The organometallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

The reaction between the transition metal compound and the organometallic compound to provide the hydrocarbon-insoluble component of my improved catalyst may be carried out by mixing the two compounds in any inert diluent, as for example, aliphatic hydrocarbons such as hexane, heptane, etc., cycloaliphatic hydrocarbons such as cyclohexane or aromatic hydrocarbons such as benzene, toluene, xylene, etc., halogenated aromatic hydrocarbons such as chlorobenzenes, chloronaphthalenes, etc., or any mixture of such inert diluents. Any concentration of the two reagents may be used that is convenient. Another method that may be used in preparing this hydrocarbon-insoluble catalyst component is to simply mix the two reagents, i.e., without the use of a diluent. In this case, after the reaction is substantially complete, the hydrocarbon-insoluble reaction product will be isolated by extraction of the mixture with an inert solvent. The reaction of the two compounds may be carried out at any temperature and will generally be determined by the solvent, if used, the activity of the reactants, etc. For example, some metal alkyls might react at Dry Ice temperatures whereas others would require elevated temperatures. Usually the reaction is conveniently carried out at room temperature or slightly elevated temperatures, but a temperature of from about −50° C. to about 150° C. could be used. In preparing the hydrocarbon-insoluble component of my catalyst the molar ratio of the two reactants may likewise be varied over a wide range. It is believed that a reduction of the transition metal compound from the higher valence state of the transition metal to one or more lower valence states takes place. Hence there should be used an amount of the organometallic compound that will produce the desired amount of reduction. Thus, larger ratios of organometallic compound to the transition metal compound are required for alkali metal alkyls than for a trialkylaluminum and in the same way, more of an alkylaluminum dihalide than a dialkylaluminum monohalide. In general, the molar ratio of organometallic compound to transition metal compound will be from about 0.1:1 to 100:1 and more usually will be from about 0.3:1 to 10:1.

That a reaction takes place between the organometallic compound and the transition metal compound is readily apparent in those cases where both reagents are soluble in the hydrocarbon diluent inasmuch as an insoluble precipitate will form, as for example, in the case of the reaction of titanium tetrachloride with any of the aluminum alkyls, etc., or the reaction of such compounds as zirconium acetylacetonate with any of the aluminum alkyls. It is this insoluble precipitate which is used as one of the reaction components in accordance with this invention.

It should be pointed out that in some cases the transition metal compound used as the starting reactant may not be soluble to any appreciable degree, as for example, zirconium tetrachloride, in the inert diluent. However, the reduction by-products are soluble and thus the insoluble product that remains is the desired hydrocarbon-insoluble reaction product catalyst component. In a few cases the reaction of the transition metal compound with the organometallic compound may not produce an insoluble precipitate, as for example, when tetrabutyl titanate is reacted with triethylaluminum in n-heptane. By using an aluminum alkyl halide such as diethylaluminum chloride, a precipitate is readily formed. It is also possible to vary the diluent used for carrying out the reaction and obtain the desired precipitate.

These hydrocarbon-isoluble catalyst components may be separated from the reaction mixture as soon as the reaction is substantially complete and then used in the polymerization. If an inert diluent is used in carrying out the reaction, the insoluble reaction product may be separated from the diluent and the soluble reaction by-products by simply allowing the mixture to settle, centrifuging, etc., and decanting the supernatant liquid, or they may be separated by filtration, etc. If the reaction was carried out in the absence of a diluent, the hydrocarbon-insoluble reaction product may be separated by extracting the reaction mixture with an inert hydrocarbon diluent so as to remove the hydrocarbon-soluble by-products. However, the activity of the hydrocarbon-insoluble reaction product catalyst component is in some cases further enhanced by allowing it to age before use. Preferably the aging will be carried out prior to separating the insoluble reaction product from the reaction mixture although it may be done after it has been separated. The aging may be carried out by allowing the reaction mixture or a suspension of the insoluble catalyst component in an inert hydrocarbon diluent to stand at room temperature or thereabouts for anywhere from a few hours to weeks, or it may be greatly speeded up by carrying out the aging at elevated temperatures up to a temperature of about 100° C. or above. In many cases, and particularly those hydrocarbon-insoluble reaction products prepared from aluminum sesquihalides or alkylaluminum dihalides, it is desirable to wash this insoluble precipitate, after it has been separated, one or more times with the inert hydrocarbon solvent so as to remove substantially all of the soluble by-products that are formed in the reaction or other hydrocarbon-soluble material. This washing procedure is of particular importance in the case of the polymerization of olefins that are readily polymerized by acid catalysis, as for example, styrene, to avoid the production of the ordinary acid-catalyzed type of polymer in the process of this invention. The hydrocarbon-insoluble reaction product catalyst component prepared as described above may be used immediately in the polymerization process or it may be stored until such time as it is desired to use it. Many of the hydrocarbon-insoluble reaction products are highly pyrophoric when dry but they are readily stored as a suspension in an inert hydrocarbon diluent. Usually they are stored at low temperatures such as 0° C. or below, any further aging effects or other changes thereby being substantially minimized.

As has already been pointed out, the process in accordance with this invention involves the use of a two-component catalyst system, one of which is the hydrocarbon-insoluble reaction product prepared as described above, and the other is an organometallic compound of a metal selected from the group of alkali metals, alkaline earth metals, zinc, earth metals, and rare earth metals, which compounds have already been exemplified above. This second catalyst component may be the same organometallic compound that was used in preparing the insoluble reaction product catalyst component or a different organometallic compound. Thus, when the polymerization is carried out in accordance with this invention, it is possible to use the less active but more readily prepared metal alkyls such as the aluminum sesquihalides for the preparation of the insoluble catalyst component and then in the polymerization process, use as the second catalyst component a metal alkyl such as triethylaluminum and still have one of the most active polymerization catalysts. Obviously this results in great overall economies. Particularly advantageous results are obtained in the process of this invention when the nonacidic metal alkyls or aryls, such as lithium alkyls or aryls, sodium alkyls or aryls, calcium alkyls, aluminum trialkyls or aryls, as for example, trimethylaluminum, triethylaluminum, triisobutylaluminum, trioctylaluminum, triphenylaluminum, etc., are used as the second catalyst component.

A very outstanding advantage in the use of the two-component catalyst combination used in this invention for the polymerization of olefins is that much lower catalyst concentrations may be used, and still obtain a practical rate, than when the transition metal compound and metal alkyl are merely mixed and used as such. As a result, the polymer so produced has a much lower inorganic content. The amount of each of the two catalyst components used in carrying out the polymerization in accordance with this invention will depend upon the monomer being polymerized, whether a batch or continuous process is used, whether they are mixed all at once, or in the batch process, one or both are added in increments, or in the continuous process, one or both are continuously added. In general, the amount of the insoluble transition metal catalyst component will be within the range of from a minor catalytic amount to a large excess, as for example, from about 0.1 to about 1000 millimoles per mole of monomer and in the batch process may be from about 0.1 millimole per liter of reaction mixture to about 100 millimoles per liter, and in some types of continuous operation even higher concentrations might be used. The amount of the organometallic catalyst component added will depend not only on the above variations but also on the activity of the organometallic compound being added. Usually the molar ratio of organometallic catalyst component to the insoluble transition metal catalyst component will be within the range of from about 0.05:1 to about 100:1, and preferably from about 0.2:1 to about 20:1.

Any ethylenically unsaturated hydrocarbon or mixtures thereof may be polymerized by the process of this invention, as for example, hydrocarbons containing vinylidene, vinyl, or vinylene groups. The invention is of particular importance for the polymerization of monoethylenically unsaturated hydrocarbons wherein the unsaturated group is a vinylidene group, which compounds have the general formula

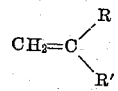

where R is alkyl and R' is alkyl, cycloalkyl, aralkyl, aryl, or alkaryl and those wherein the vinylidene group is a vinyl group, which compounds have the general formula $CH_2=CHR$ where R is hydrogen, a linear alkyl, a branched chain alkyl, cycloalkyl, aryl, aralkyl, or alkaryl, and for the polymerization of polyethylenicaly unsaturated hydrocarbons such as conjugated diolefins. Exemplary of the ethylenically unsaturated hydrocarbons which may be homopolymerized or mixtures of which may be copolymerized are the linear 1-olefins such as ethylene, propylene, butene-1, hexene-1, heptene-1, octene-1, octadecene-1, dodecene-1, etc., and branched chain 1-olefins and other olefins such as isobutylene, cis-butene, diisobutylene, tert-butylethylene, 4- and 5-methylheptenes-1, tetramethylethylene, and substituted derivatives thereof such as styrene, α-methylstyrene, vinylcyclohexane, diolefins such as hexadiene-1,4, 6-methylheptadiene-1,5 and conjugated diolefins such as butadiene, isoprene, pentadiene-1,3, cyclic olefins such as cyclopentadiene, cyclohexene, 4-vinylcyclohexene-1, terpenes such as β-pinene, etc. As has already been mentioned, the process of this invention makes it possible to polymerize even the more difficultly polymerizable olefins under very mild conditions of temperature and pressure. In fact, by means of this invention it has been possible for the first time to polymerize propylene at atmospheric pressure.

The polymerization of the ethylenically unsaturated hydrocarbon or copolymerization of any mixture of two or more such compounds may be carried out in a wide variety of ways. The process may be carried out as either a batch or continuous operation and with or without the use of an inert organic diluent as the reaction mixture. With the more volatile monomers, a diluent is usually preferred. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated aromatic hydrocarbons such as chlorobenzenes, chloronaphthalenes, etc.

The selection of the temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about $-50°$ C. to about $150°$ C. and preferably from about $-20°$ C. to about $100°$ C. may be used. In the same way, while atmospheric pressure or a pressure of only a few pounds may be used, the polymerization may be carried out over a wide range of pressure, as for example, from a partial vacuum to about 1000 lbs. and preferably from about atmospheric to about 500 lbs. pressure. Higher pressures may, of course, be used, but generally do not appreciably alter the course of the polymerization.

The manner in which the two catalyst components are added to the polymerization system will depend upon the method by which the polymerization is carried out. They may be added all at once, in any order, or one or the other or both may be added in increments or continuously during the polymerization. Excellent results, and in some cases superior results, may be obtained by mixing the two catalyst components together, allowing the mixture to age for a short time and then adding the mixture all at one time, in increments, or continuously to the polymerization process. The two catalyst components that are combined for the polymerization will depend upon the monomer being polymerized, the degree of polymerization, etc. For the readily polymerized olefins such as ethylene, excellent results may be obtained with any combination of a hydrocarbon-insoluble component with organometallic catalyst component. For less readily polymerized olefins, the most active combinations are preferred, as for example, the hydrocarbon-insoluble reaction product, produced from titanium tetrachloride and an alkylaluminum halide, in combination with triethyl- or other trialkyl-aluminum as the second component.

The following examples will illustrate the homopolymerization and copolymerization of a wide variety of olefins in accordance with the process of this invention and some of the many variations that may be made in this process. As may be seen from these examples, it is possible to select the proper conditions to prepare a polymer of any desired molecular weight. The molecular weight of the polymers produced in these examples is shown by the reduced specific viscosity (RSV) given for each. By the term "reduced specific viscosity" is mean the $\eta sp./C.$ determined on an 0.1% solution of the polymer in decalin, containing 0.1 g. of the polymer per 100 ml. of solution, at $135°$ C. Where the melting point of the polymer is given, it is the temperature at which the birefringence due to crystallinity disappears. All parts and percentages are by weight unless otherwise indicated.

PREPARATION OF THE HYDROCARBON-INSOLUBLE CATALYST COMPONENT

The preparation of the hydrocarbon-insoluble reaction product of titanium tetrachloride and diethylaluminum chloride used as one of the catalyst components in Examples 1–3 is typical of the preparation of these catalyst components and was carried out as follows:

A sealed vessel, from which the air had been evacuated and replaced by nitrogen, was charged with 32.6 parts of n-heptane, 14.3 parts of a 1.12 molar solution of diethylaluminum chloride in n-heptane, and 16.6 parts of an 0.5 molar solution of titanium tetrachloride in n-heptane (molar ratio of aluminum compound to titanium compound of 2:1). The mixture was stirred and then allowed to stand for 2 hours at room temperature. The reaction mixture was centrifuged, the supernatant liquid removed, and fresh n-heptane was added to bring it to the original volume. The insoluble precipitate was resuspended by agitation and the mixture was again centrifuged and the supernatant removed. After again adding n-heptane to the original volume, the catalyst was aged for one day at room temperature and then stored at $-15°$ C. until used for polymerization.

The hydrocarbon-insoluble reaction products of other transition or heavy metal compounds and organometallic compound used in the other examples below were prepared in the same fashion but the reactants, molar ratio of reactants, etc., were varied as indicated in each case. Some of these suspensions of insoluble reaction product were used without aging, others were aged for varying lengths of time and temperature. Such variations are also indicated in each case.

*Examples 1–17*

The air in a series of polymerization vessels was replaced with nitrogen and into each was then charged 33 parts of n-heptane and 8 parts of propylene after which the vessel was placed on a rotating rack in a constant temperature bath held at $30°$ C. When the vessel and contents were equalized at that temperature (an initial pressure of about 45 p.s.i.g.), the metal alkyl catalyst component was introduced and then the hydrocarbon-insoluble reaction product catalyst component was added, the former as a 1 M solution in n-heptane and the latter as a suspension in n-heptane prepared as described above. In Table I below are set forth, for each of these examples, the aluminum alkyl used to react with titanium tetrachloride in the preparation of the hydrocarbon-insoluble reaction product used as one component of the polymerization catalyst and the molar ratio of the two reactants used, the amount of this insoluble catalyst component added to the polymerization vessel, the metal alkyl used as the second catalyst component and the parts of it added to each polymerization vessel. In Examples 11–17 the insoluble catalyst component was aged, prior to separation and purification, at room temperature and the length of such aging is shown. In the remaining examples this catalyst component was used immediately after preparation and without aging. The reaction time shown in the table is taken from the time the hydrocarbon-insoluble catalyst component was added to the polymerization system.

At the end of the specified reaction time, the polymerization was stopped by the addition of 4 parts of anhydrous ethanol. Both heptane-soluble and heptane-insoluble polymers were produced. The insoluble polymer in each case was separated by filtration, washed twice with n-heptane, twice with absolute ethanol and then was refluxed for 15 minutes with 40 parts of 10% methanolic hydrogen chloride, after which it was washed acid-free with methanol and then dried for 4 hours at $80°$ C. in vacuo. The heptane-soluble polymer was isolated by combining the reaction mixture filtrate and heptane washings, concentrating by distillation, and then precipitating the polymer by adding a large excess of anhydrous ethanol. The polymer so obtained was washed with ethanol and then dried for 16 hours at 80° C. in vacuo.

The heptane-insoluble polypropylene produced in these examples is a crystalline material whereas the heptane-soluble polymer is rubbery. The amount of each produced and their characteristics are shown in the table. In general, the insoluble polymer produced in these examples had a melting point of around 160° C. (162° C. in Examples 1 and 3; 164° C. in Example 11; 168° C. in Example 12; 167° C. in Example 13; and 158° C. in Example 14).

the soluble and insoluble polymers, there was obtained an amount of the soluble polymer equivalent to a conversion of 31% with an RSV of 1.6 and an amount of insoluble polymer equivalent to a conversion of 50% with an RSV of 4.4.

Examples 20–34

In this series of examples, each polymerization vessel (nitrogen atmosphere) was charged with 33 parts of n-heptane, then evacuated and 2 parts of ethylene was added. After equalizing at 30° C., a solution of the organometallic catalyst component in n-heptane and the suspension of the insoluble titanium catalyst component

TABLE I

| Ex. No. | Insoluble reaction product catalyst component formed from— | | | | Metal alkyl catalyst component | Parts ×10⁻² | Reaction time, hrs. | Heptane-soluble polymer | | Heptane-Insoluble polymer | |
|---|---|---|---|---|---|---|---|---|---|---|---|
| | Al alkyl | Parts ×10⁻² | TiCl₄ parts ×10⁻² | A:T ratio [1] | | | | Percent conv. | R.S.V. | Percent conv. | R.S.V. |
| 1 | Al(C₂H₅)₂Cl | 12.06 | 9.5 | 2:1 | Al(C₂H₅)₃ | 11.4 | 0.25 | 42 | 1.4 | 39 | 2.9 |
| 2 | Al(C₂H₅)₂Cl | 6.03 | 4.75 | 2:1 | Al(C₂H₅)₃ | [2] 11.4 | 2.0 | 30 | 1.8 | 60 | 3.9 |
| 3 | Al(C₂H₅)₂Cl | 6.03 | 4.75 | 2:1 | Al(i-C₄H₉)₃ | 19.8 | 2.0 | 47 | 2.2 | 38 | 4.6 |
| 4 | Al(C₂H₅)₂Cl | 6.03 | 4.75 | 2:1 | NaC₅H₁₁ | 18.8 | 18 | 15 | 6.0 | 13 | 1.9 |
| 5 | Al(C₂H₅)₃ | 5.7 | 4.75 | 2:1 | Al(C₂H₅)₃ | 5.7 | 19 | 46 | 0.5 | 28 | 4.6 |
| 6 | Al(C₂H₅)₃ | 5.7 | 4.75 | 2:1 | Al(C₂H₅)₂Cl | 6.0 | 19 | 25 | 0.5 | 15 | 5.5 |
| 7 | Al(i-C₄H₉)₃ | 9.9 | 4.75 | 2:1 | Al(i-C₄H₉)₃ | 19.8 | 2.5 | 31 | 1.3 | 22 | 4.9 |
| 8 | Al(i-C₄H₉)₃ | 9.9 | 4.75 | 2:1 | NaC₅H₁₁ | 18.8 | 2.5 | 33 | 1.2 | 15 | 5.2 |
| 9 | Al(C₂H₅)Cl₂ | 12.7 | 4.75 | 4:1 | Al(C₂H₅)₃ | 11.4 | 4.7 | 32 | 1.4 | 40 | 10.3 |
| 10 | Al sesquichloride | 9.3 | 4.75 | 3:1 | Al(C₂H₅)₃ | 11.4 | 3.5 | 35 | 2.2 | 47 | 4.8 |
| 11 | Al(C₂H₅)Cl₂ (aged 26 days) | 12.7 | 4.75 | 4:1 | Al(C₂H₅)₃ | 11.4 | 43 | 16 | 1.2 | 65 | 15.3 |
| 12 | Al(C₂H₅)₂Cl (aged 35 days) | 1.5 | 4.75 | 0.5:1 | Al(C₂H₅)₃ | 11.4 | 19 | 20 | 2.4 | 36 | 5.5 |
| 13 | do | 3.0 | 4.75 | 1:1 | Al(C₂H₅)₃ | 11.4 | 19 | 42 | 2.3 | 52 | 5.5 |
| 14 | do | 6.03 | 4.75 | 2:1 | Al(C₂H₅)₃ | 11.4 | 2.5 | 38 | 3.1 | 46 | 5.5 |
| 15 | Al(C₂H₅)₂Cl (aged 21 days) | 18.09 | 4.75 | 6:1 | Al(C₂H₅)₃ | 11.4 | 0.5 | 37 | 1.8 | 50 | 3.1 |
| 16 | Al(C₂H₅)₂Cl (aged 3 weeks) | 7.24 | 1.9 | 6:1 | Al(C₂H₅)₃ | 11.4 | 3.3 | 30 | 2.2 | 55 | 5.1 |
| 17 | do | 3.62 | 0.95 | 6:1 | Al(C₂H₅)₃ | 11.4 | 9.1 | 29 | 2.2 | 47 | 6.1 |

[1] Molar ratio of aluminum alkyl to titanium tetrachloride used in the preparation of the insoluble reaction product.
[2] Added in 2 increments of 0.057 part each, the second added 1 hour after the first.

Example 18

Example 15 was repeated using toluene as the diluent for the polymerization instead of the n-heptane used in that example and the insoluble catalyst component was not aged prior to separation and purification. At the end of 3 hours at 30° C. the pressure had dropped to 7 p.s.i.g. and the polymerization was stopped. The reaction mixture was viscous and contained both soluble and insoluble polymer. The soluble polymer had an RSV of 2.1 and amounted to a conversion of 31% and the insoluble polymer amounted to a conversion of 41% and had an RSV of 6.5.

Example 19

Example 2 was repeated except that in this example the insoluble reaction product catalyst component was prepared in n-heptane as usual, but after separating by centrifugation, it was resuspended in n-heptane and used without washing. Also, the triethylaluminum was added all at one time instead of in increments. At the end of 3 hours at 30° C. the pressure had dropped to 0 p.s.i.g. The reaction mixture was very viscous. On isolation of in n-heptane were added. The initial pressure was about 50 p.s.i.g. The aluminum alkyl, the ratio of aluminum alkyl to titanium tetrachloride and aging, if any, used in the preparation of the insoluble titanium catalyst component, the metal alkyl, and the parts of each catalyst component added to the polymerization system in each case are set forth in Table II below.

When the polymerization was substantially complete as indicated by a drop in the gage pressure to 0 p.s.i., 4 parts of anhydrous ethanol was introduced to stop the polymerization. The polymer which had separated as an insoluble precipitate in each case was separated by filtration, washed twice with n-heptane, twice with absolute ethanol, refluxed for 15 minutes with 40 parts of a 10% methanolic solution of hydrogen chloride, filtered, and the polymer was washed with methanol until the filtrate was acid-free. The polymers so obtained were then dried for 4 hours at 80° C. in vacuo. The conversion of ethylene to polyethylene, reduced specific viscosity, and melting point of the crystalline polymer are also tabulated in Table II.

Table II

| Ex. No. | Insoluble reaction product catalyst component formed from— | | | | | Organometallic catalyst component | Parts ×10⁻² | Reaction time hrs. [3] | Percent conv. | R.S.V. | Cryst. M.P.° C. |
|---|---|---|---|---|---|---|---|---|---|---|---|
| | Al alkyl | Parts ×10⁻² | TiCl₄ parts ×10⁻² | A:T ratio [1] | Aged [2] | | | | | | |
| 20 | Al(C₂H₅)₂Cl | 6.03 | 4.75 | 2:1 | 1 day | Al(C₂H₅)Cl₂ | 12.7 | 2.4 | 78 | 21.0 | 134 |
| 21 | Al(C₂H₅)₂Cl | 6.03 | 4.75 | 2:1 | do | Al(C₂H₅)₂Cl | 6.03 | 1.0 | 90 | 18.4 | 132 |
| 22 | Al(C₂H₅)₂Cl | 6.03 | 4.75 | 2:1 | do | Al(C₂H₅)₃ | 5.7 | 0.25 (−4 p.s.i.) | 90 | 10.0 | 136 |
| 23 | Al(C₂H₅)₃ | 5.7 | 4.75 | 2:1 | | Al(C₂H₅)Cl₂ | 12.7 | 19 (14 p.s.i.) | 65 | 54.9 | 136 |
| 24 | Al(C₂H₅)₃ | 5.7 | 4.75 | 2:1 | | Al(C₂H₅)₂Cl | 6.03 | 0.2 | 94 | 27.4 | 136 |
| 25 | Al(C₂H₅)₃ | 5.7 | 4.75 | 2:1 | | Al(C₂H₅)₃ | 5.7 | 0.25 (−7 p.s.i.) | 92 | 12.1 | 139 |
| 26 | Al(C₂H₅)₂Cl | 1.51 | 4.75 | 0.5:1 | 5 weeks | Al(C₂H₅)₃ | 5.7 | 1.5 | 74 | 22.1 | |
| 27 | Al(C₂H₅)₂Cl | 3.01 | 4.75 | 1:1 | do | Al(C₂H₅)₃ | 5.7 | 0.7 | 90 | 16.3 | |
| 28 | Al(C₂H₅)₂Cl | 18.09 | 4.75 | 6:1 | 3 weeks | Al(C₂H₅)₃ | 5.7 | 0.25 (−5 p.s.i.) | 81 | 10.9 | |
| 29 | Al(C₂H₅)Cl₂ | 12.7 | 4.75 | 4:1 | 4 weeks | Al(C₂H₅)₃ | 11.4 | 0.4 | 91 | 27.3 | |
| 30 | Al sesquichloride | 9.3 | 4.75 | 3:1 | | Al(C₂H₅)₃ | 11.4 | 0.25 (−9 p.s.i.) | 91 | 11.2 | |
| 31 | Al(C₂H₅)₂Cl | 6.03 | 4.75 | 2:1 | | NaC₅H₁₁ | 9.4 | 0.5 | 79 | 12.5 | |
| 32 | Al(C₂H₅)₂Cl | 6.03 | 4.75 | 2:1 | | LiC₄H₉ | 6.4 | 0.25 | 90 | 25.7 | |
| 33 | Al(C₂H₅)₂Cl | 18.08 | 4.75 | 6:1 | | LiC₆H₅ | 8.4 | 19 (−5 p.s.i.) | 88 | 55.3 | |
| 34 | Al(C₂H₅)₂Cl | 18.08 | 4.75 | 6:1 | | Al(C₈H₁₇)₃ | 12.7 | 0.5 | 86 | 25.1 | |

[1] Molar ratio of aluminum alkyl to titanium tetrachloride used in preparation of the insoluble reaction product.
[2] Length of time this catalyst component was aged at room temperature prior to separation and purification.
[3] Time to 0 gage pressure unless otherwise indicated.

Examples 35–40

The hydrocarbon-insoluble reaction product catalyst components used in these examples were prepared in the usual manner by reacting solutions of the organometallic compound with the transition metal compound in n-heptane (Examples 35 and 40) or toluene (Examples 36–39). The two reactants used, parts of each, and molar ratio of the two are set forth in Table III below. In Example 36 the reaction mixture was aged for 2 hours before the insoluble precipitate was separated and washed. In Example 40 the two reagents were reacted at −70° C. instead of room temperature and then stored at −15° C. for 8 days. In each case the insoluble catalyst component was suspended in n-heptane before use in the polymerization system.

To each polymerization vessel, with a nitrogen atmosphere, was charged 33 parts of n-heptane and 2 parts of ethylene. After equalizing the temperature at 30° C., an amount of a 1 M solution of triethylaluminum in n-heptane equal to $5.7 \times 10^{-2}$ parts of the triethylaluminum was added followed by the insoluble reaction product catalyst component. As before, the reaction time is that required for a drop (from about 50 p.s.i.) in gage pressure to 0. The data for each example are set forth in Table III.

ponent. The polymerization was carried out at 30° C. for 19 hours and then at 90° C. for an additional 24 hours, after which the insoluble polymer was isolated in the usual manner.

Examples 42–46

The hydrocarbon-insoluble reaction product catalyst component used in each of these examples was prepared in the usual manner by mixing solutions of the organometallic compound and transition metal compound in n-heptane, separating the precipitate, washing it with n-heptane, and resuspending it in n-heptane.

To each polymerization vessel (nitrogen atmosphere) was charged 33 parts of n-heptane and 10 parts of the olefin being polymerized, except for Example 46 where the n-heptane charge was omitted, the only n-heptane present in this case being that added with the catalysts (6.1 parts). After equalizing each at 30° C., the organometallic catalyst component was added, followed by addition of the insoluble catalyst component. The amounts of the reactants and other data for each example are given in Table IV.

The soluble and insoluble polymers produced were isolated as in the foregoing examples, except in the case of Examples 43 and 44. In Example 43 the reaction mixture was a viscous solution and the polymer was isolated

TABLE III

| Ex. No. | Insoluble reaction product catalyst component formed from— | | | | | Organometallic catalyst component | Parts $\times 10^{-2}$ | Reaction time, Hrs. | Percent conv. | R.S.V. |
|---|---|---|---|---|---|---|---|---|---|---|
| | Organometallic compound | Parts $\times 10^{-2}$ | Transition metal compound | Parts $\times 10^{-2}$ | A:T ratio a | | | | | |
| 35 | Al(C$_2$H$_5$)$_2$Cl | 18.08 | Ti(OC$_4$H$_9$)$_4$ | 6.7 | 6:1 | Al(C$_2$H$_5$)$_3$ | 5.7 | 0.25 | 83 | 15.8. |
| 36 | Al(C$_2$H$_5$)$_2$Cl | 18.08 | Zr acetylacetonate | 12.19 | 6:1 | Al(C$_2$H$_5$)$_3$ | 5.7 | 3.0 (3 p.s.i.) | 77 | Too high to measure at 0.1% conc. in decalin |
| 37 | Al(C$_2$H$_5$)$_2$Cl | 18.08 | V oxyacetylacetonate | 6.6 | 6:1 | Al(C$_2$H$_5$)$_3$ | 5.7 | 2.0 (−1 p.s.i.) | 88 | 13.5. |
| 38 | Al(C$_2$H$_5$)$_2$Cl | 18.08 | Cr acetylacetonate | 8.5 | 6:1 | Al(C$_2$H$_5$)$_3$ | 5.7 | 1.0 | 83 | 22.1. |
| 39 | Al(C$_2$H$_5$)$_2$Cl | 18.08 | FeCl$_3$ b | 4.06 | 6:1 | Al(C$_2$H$_5$)$_2$Cl | 12.06 | 24 (42 p.s.i.) | 10 | Too high to measure at 0.1% conc. in decalin. |
| 40 | LiC$_4$H$_9$ | 4.0 | TiCl$_4$ | 4.75 | 2.5:1 | Al(C$_2$H$_5$)$_3$ | 5.7 | 0.25 (−7 p.s.i.) | 91 | 32.1. | a Molar ratio of organometallic compound to transition metal compound used in preparation of the insoluble reaction product catalyst component.
b Aged prior to separation by heating for 16 hours at 90° C.

Example 41

The hydrocarbon-insoluble reaction product catalyst component used in this example was that prepared by reacting $17.6 \times 10^{-2}$ parts of manganese triacetylacetonate with $36.16 \times 10^{-2}$ parts of diethylaluminum chloride (6:1 molar ratio of aluminum compound to manganese compound) in toluene. The insoluble product was separated by centrifugation, fresh toluene added, recentrifuged, and finally suspended in toluene.

A polymerization vessel, having a nitrogen atmosphere, was charged with 33 parts of n-heptane and 2 parts of ethylene. After equalizing the temperature at 30° C., $39 \times 10^{-2}$ parts of ethylaluminum dichloride was added followed by the insoluble reaction product catalyst comby diluting the reaction mixture with n-heptane to a workable viscosity, precipitating it by pouring into a large excess of anhydrous ethanol, and then filtering and washing with ethanol and drying. In Example 44 the insoluble polymer was filtered off as usual and then purified by dissolving it in hot decalin (about 160° C.), and after filtering, reprecipitating the polymer by pouring the decalin solution into anhydrous ethanol and then filtering to recover the solid polymer.

TABLE IV

| Ex. No. | Monomer | Insoluble reaction product catalyst component formed from— | | | | Organometallic catalyst component | Parts $\times 10^{-2}$ | Reaction time, hrs. | Percent conv. |
|---|---|---|---|---|---|---|---|---|---|
| | | Al alkyl | Parts $\times 10^{-2}$ | TiCl$_4$ parts $\times 10^{-2}$ | A:T ratio | | | | |
| 42 | Butadiene | Al(C$_2$H$_5$)$_3$ | 5.7 | 4.75 | 2:1 | Al(C$_2$H$_5$)$_3$ | 5.7 | 19 | 3% of an insoluble polymer, 16% of a rubbery soluble polymer. |
| 43 | Octene-1 | Al(C$_2$H$_5$)$_2$Cl | 6.03 | 4.75 | 2:1 | Al(C$_2$H$_5$)$_3$ | 11.4 | 19 | 73% of a soluble, very tacky, rubber-like polymer. |
| 44 | Isobutylene | Al(C$_2$H$_5$)$_2$Cl | 12.06 | 9.5 | 2:1 | Al(C$_2$H$_5$)$_3$ | 11.4 | 19 | (1). |
| 45 | Butene-1 | Al(C$_2$H$_5$)$_2$Cl | 6.03 | 4.75 | 2:1 | Al(C$_2$H$_5$)$_3$ | 11.4 | 19 | 51% of a crystalline insoluble polymer (M.P. 112°C. and R.S.V. of 11.7), 22% of a soluble, rubbery polymer (R.S.V. 2.8). |
| 46 | Styrene | Al(C$_2$H$_5$)$_2$Cl | 36.18 | 9.5 | 6:1 | Al(C$_8$H$_{17}$)$_3$ | 25.4 | 19 | 11% of a crystalline polymer, insoluble in ordinary solvents at room temperature, M.P. above 212°C. and R.S.V. of 8.0 (0.1% solution in α-chloronaphthalene at 135° C.). |

1 Polymer recovered by precipitation in anhydrous ethanol was a fibrous material which was found to be a high melting crystalline polymer, having an x-ray diffraction pattern unlike that of ordinary polyisobutylene.

Examples 47–61

The hydrocarbon-insoluble reaction product catalyst component used in these examples was prepared by the standard procedure from $6.03 \times 10^{-2}$ parts of diethylaluminum chloride and 4.75×10⁻² parts of titanium tetrachloride (2:1 molar ratio) and used without aging. In each case a polymerization vessel, with a nitrogen atmosphere, was charged with 33 parts n-heptane, the ethylene or propylene, the insoluble titanium catalyst component, a comonomer, and triethylaluminum or triisobutylaluminum. The monomer and comonomer and amount of each charged and the organometallic catalyst component used in each case are set forth in Table V below along with the results obtained, the copolymerization being carried out at 30° C. in each case. In Examples 48, 50, 52, 58 and 59 the n-heptane charge was omitted, the only diluent in these cases being the amount introduced with the catalyst components.

In all cases a copolymer insoluble in the reaction medium was produced. In a few cases there was also produced a soluble copolymer, the data on which are given following the table. The soluble and insoluble copolymers were isolated in the usual manner.

conversion of 48% and had an R.S.V. of 6.9 and the soluble polymer amounted to a conversion of 29% and had an R.S.V. of 2.2.

Example 64

The hydrocarbon-insoluble reaction product catalyst component used in this example was prepared by mixing 14.4 parts of diethylaluminum chloride with 11.4 parts of titanium tetrachloride in n-heptane, the total solution being 625 parts. This mixture was allowed to stand at room temperature for 1.5 hours, after which it was filtered. The precipitate was suspended in an equal volume of fresh heptane, allowed to stand 15 minutes, filtered, and was again diluted with n-heptane and allowed to stand 16 hours. The brown precipitate was separated by filtration and washed into a total of 1000 parts of heptane.

The above insoluble catalyst component suspension was charged into a polymerization vessel along with 3000 parts of heptane and 20 parts of a crude triisobutylaluminum

TABLE V

| Ex. No. | Monomer | Parts | Comonomer | Parts | Organometallic catalyst component | Parts ×10⁻² | Reaction time, hrs. | Heptane-insoluble copolymer isolated ||||
|---|---|---|---|---|---|---|---|---|---|---|---|
| | | | | | | | | Percent conv. based on monomer | R.S.V. | M.P. °C. | Comonomer content,¹ percent |
| 47 | Ethylene | 2.0 | Styrene | 10.0 | Al(C₂H₅)₃ | 5.7 | 0.13 | 50 | 15.6 | 134 | 3.3 |
| 48 | do | 2.0 | do | 50.0 | Al(i-C₄H₉)₃ | 19.8 | 0.25 | 55 | 20.0 | 132 | 6.7 |
| 49 | do | 2.0 | α-Methylstyrene | 10.0 | Al(C₂H₅)₃ | 5.7 | 0.13 | 67 | 13.9 | 136 | |
| 50 | do | 2.0 | do | 50.0 | Al(i-C₄H₉)₃ | 19.8 | 0.25 | 85 | 21.2 | 133 | 1.6 |
| 51 | do | 2.0 | Isobutylene | 11.7 | Al(C₂H₅)₃ | 5.7 | 0.13 | 71 | 5.9 | 131 | 5.4 |
| 52 | do | 1.1 | do | 50.8 | Al(i-C₄H₉)₃ | 19.8 | 0.5 | 82 | 5.5 | 127 | 18.7 |
| 53 | do | 2.0 | Octene-1 | 10.0 | Al(C₂H₅)₃ | 5.7 | 0.13 | 76 | 9.0 | 129 | 5.8 |
| 54 | do | 2.0 | Isoprene | 10.0 | Al(i-C₄H₉)₃ | 19.8 | 3.5 | 40 | 20.2 | 134 | |
| 55 | do | 2.0 | Cyclopentadiene | 10.0 | Al(i-C₄H₉)₃ | 19.8 | 19 | 13 | (²) | | |
| 56 | do | 2.0 | cis-Butene | 10.0 | Al(i-C₄H₉)₃ | 19.8 | 0.25 | 90 | 9.8 | 129 | 1.6 |
| 57 | do | 2.0 | Butadiene | 10.8 | Al(C₂H₅)₃ | 5.7 | 1.0 | ³ 63 | 2.7 | | ⁴ 33 |
| 58 | Propylene | 8.2 | Styrene | 50.0 | Al(C₂H₅)₃ | 11.4 | 2.8 | 6.2 | 7.9 | 152 | 25 |
| 59 | do | 8.0 | α-Methylstyrene | 50.0 | Al(C₂H₅)₃ | 11.4 | 0.75 | 15.0 | 4.8 | 167 | |
| 60 | do | 7.5 | Butadiene | 0.7 | Al(C₂H₅)₃ | 11.4 | 19 | ³ 13.7 | 5.1 | 159 | |
| 61 | Octene-1 | 7 | do | 3 | Al(C₂H₅)₃ | 5.7 | 18.5 | ³ 0.3 | | | |

¹ Analyzed by infrared.
² Polymer was not soluble in decalin at 135° C. so R.S.V. could not be determined.
³ A soluble copolymer, described below, also produced.
⁴ Analyzed by C and H.

In Example 57 the soluble polymer amounted to a 22% conversion and it had an R.S.V. of 0.4 and in Example 60 the soluble polymer amounted to a 2.1% conversion and had an R.S.V. of 1.3. In Example 61 the soluble polymer was rubbery, amounted to an 11% conversion and on analysis was shown to have a butadiene content of 81%.

Example 62

In this example the first and second catalyst components were mixed, aged 20 minutes, and then injected into the polymerization mixture. The hydrocarbon-insoluble reaction product catalyst component was prepared from 6.03×10⁻² parts of diethylaluminum chloride and 4.75×10⁻² parts of titanium tetrachloride (2:1 molar ratio) in n-heptane, filtered, washed and resuspended in n-heptane. To this suspension was then added 0.7×10⁻² parts of triethylaluminum. After aging for 20 minutes at room temperature, this aged two-component catalyst mixture was injected into a polymerization vessel containing 33 parts of n-heptane and 2 parts of ethylene, equalized to 30° C. After 15 minutes the gage pressure had dropped from about 50 p.s.i. to −5 p.s.i. The insoluble polymer so produced was isolated as usual by filtration. It amounted to a conversion of 95% and had an R.S.V. of 26.4.

Example 63

Example 62 was repeated except that the ethylene was replaced by 8 parts of propylene, and 2.8×10⁻² parts of triethylaluminum was used in place of the 0.7×10⁻² parts used in that example. After 21 hours at 30° C. the pressure had dropped to 2 p.s.i.g. The reaction mixture was viscous and contained both soluble and insoluble polypropylene. The insoluble polymer amounted to a containing 35% diisobutylaluminum hydride. The slurry was heated to 35° C. and propylene was passed into the reaction mixture at atmospheric pressure. The temperature was raised to 50–55° C. and held at that temperature throughout the polymerization. The rate at which the propylene was introduced was adjusted so that it was completely used up in the system. At the end of 6 hours, the reaction had essentially stopped. At this point 96 parts of anhydrous butanol was added and the reaction mixture was allowed to stand for 40 hours. The reaction mixture slurry was diluted to 8000 parts by volume, 3200 parts of butanol was added, and on addition of 1600 parts of methanol, a crumblike flocculent precipitate was obtained. This precipitate was filtered, washed with methanol, and air-dried for 26 hours. It was a fibrous, rubbery mass of low density and amounted to 416 parts. This product was separated into 215 parts of a heptane-insoluble, crystalline polymer (R.S.V.=3.9; M.P. 165° C.) and 128 parts of a heptane-soluble, rubbery polymer (R.S.V.=1.7). The crystalline polymer was readily molded to yield a tough plastic.

The periodic chart used in this specification and appended claims for designating the groups and subgroups of the periodic table is that given in the "Handbook of Chemistry and Physics" published by Chemical Rubber Publishing Company, Cleveland, Ohio, on pages 392–3 of the 36th edition.

What I claim and desire to protect by Letters Patent is:
1. The process of polymerizing at least one ethylenically unsaturated hydrocarbon which comprises polymerizing the said unsaturated hydrocarbon with a catalytic amount of a two-component catalyst composition comprising (1) the hydrocarbon-insoluble reaction product, separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

2. The process of claim 1 wherein a monoethylenically unsaturated hydrocarbon containing a vinylidene group is copolymerized with an ethylenically unsaturated hydrocarbon.

3. The process of claim 2 wherein a monoethylenically unsaturated hydrocarbon containing a vinylidene group is a linear 1-olefin.

4. The process of claim 3 wherein the 1-olefin is ethylene.

5. The process of claim 4 wherein ethylene is copolymerized with a monoethylenically unsaturated hydrocarbon.

6. The process of polymerizing at least one ethylenically unsaturated hydrocarbon which comprises polymerizing the said unsaturated hydrocarbon with a catalytic amount of a two-component catalyst composition comprising (1) the hydrocarbon-insoluble reaction product, separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and washed substantially free of hydrocarbon-soluble reaction by-products with a liquid diluent consisting of an inert hydrocarbon, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

7. The process of polymerizing at least one monoethylenically unsaturated hydrocarbon containing a vinylidene group which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of meals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

8. The process of polymerizing at least one conjugated diolefin which comprises polymerizing the said unsaturated hydrocarbon with a catalytic amount of a two-component hydrocarbon-catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

9. The process of polymerizing at least one monoethylenically unsaturated hydrocarbon containing a vinyl group which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

10. The process of polymerizing at least one monoethylenically unsaturated aliphatic hydrocarbon containing a vinylidene group which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valance state, with a metal alkyl compound of a metal selected from the group consisting of alkali metals, alkaline earthmetals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

11. The process of polymerizing at least one monoethylenically unsaturated aliphatic hydrocarbon containing a vinyl group which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

12. The process of polymerizing a monoethylenically unsaturated aromatic hydrocarbon containing a vinylidene group which comprises polymerizing the said unsaturated hydrocarbon with a catalytic amount of a two-component catalyst composition comprising (1) the hydrocarbon-insoluble reaction product, separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

13. The process of polymerizing a linear 1-olefin which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

14. The process of polymerizing propylene which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

15. The process of polymerizing isobutylene which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

16. The process of polymerizing a styrene which comprises polymerizing the said unsaturated hydrocarbon with a catalytic amount of a two-component catalyst composition comprising (1) the hydrocarbon-insoluble reaction product separated from the hydrocarbon-soluble products of the reaction of a compound selected from the group consisting of inorganic and organic salts and complexes of a metal selected from the group consisting of metals of groups IV–B, V–B, VI–B and VIII of the periodic table and manganese, wherein the metal in said compound is at other than its lowest valence state, with a metal alkyl compound of a metal selected from the group consisting of alkali metals, alkaline earth metals, zinc, and earth metals in a molar ratio of from about 1:0.1 to about 1:100, and (2) a metal alkyl compound of a metal selected from the group consisting of alkali metals, alkaline earth metals, zinc, and earth metals, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

17. The process of polymerizing propylene which comprises polymerizing propylene with a catalytic amount of a two-component catalyst composition comprising (1) the hydrocarbon-insoluble reaction product separated from the hydrocarbon-soluble products of the reaction of titanium tetrachloride with an alkyl-aluminum halide in a molar ratio of from about 1:0.1 to about 1:100, and (2) an alkylaluminum compound, said catalyst component (1) being present in an amount of from about 0.1 to about 1000 millimoles per mole of propylene, and the ratio of catalyst component (2) to catalyst component (1) being from about 0.05:1 to about 100:1.

18. The process of polymerizing isobutylene which comprises polymerizing isobutylene with a catalytic amount of a two-component catalyst composition comprising (1) the hydrocarbon-insoluble reaction product separated from the hydrocarbon-soluble products of the reaction of titanium tetrachloride with an alkyl-aluminum halide in a molar ratio of from about 1:0.1 to about 1:100, and (2) an alkylaluminum compound, said catalyst component (1) being present in an amount of from about 0.1 to about 1000 millimoles per mole of isobutylene, and the ratio of catalyst component (2) to catalyst component (1) being from about 0.05:1 to about 100:1.

19. The process of polymerizing styrene which comprises polymerizing styrene with a catalytic amount of a two-component catalyst composition comprising (1) the hydrocarbon-insoluble reaction product separated from the hydrocarbon-soluble products of the reaction of titanium tetrachloride with an alkylaluminum halide in a molar ratio of from about 1:0.1 to about 1:100, and (2) an alkylaluminum compound, said catalyst component (1) being present in an amount of from about 0.1 to about 1000 millimoles per mole of styrene, and the ratio of catalyst component (2) to catalyst component (1) being from about 0.05:1 to about 100:1.

20. The process of polymerizing a monoethylenically unsaturated aliphatic hydrocarbon containing a vinyl group which comprises polymerizing the said unsaturated hydrocarbon with a catalytic amount of a two-component catalyst composition comprising (1) the hydrocarbon-insoluble reaction product produced by the reaction of titanium tetrachloride with an alkylaluminum halide in a molar ratio of from about 1:0.1 to about 1:100, and (2) a trialkylaluminum, said catalyst component (1) being present in an amount of from about 0.1 to about 1000 millimoles per mole of ethylenically unsaturated hydrocarbon, and the ratio of the catalyst component (2) to catalyst component (1) being from about 0.05:1 to about 100:1.

21. The process of polymerizing isobutylene which comprises polymerizing isobutylene with a catalytic amount of a two-component catalyst composition comprising (1) the hydrocarbon-insoluble reaction product separated from the hydrocarbon-soluble products of the reaction of titanium tetrachloride with an alkylaluminum halide in a molar ratio of from about 1:0.1 to about 1:100, and (2) a trialkylaluminum, said catalyst component (1) being present in an amount of from about 0.1 to about 1000 millimoles per mole of isobutylene, and the ratio of the catalyst component (2) to catalyst component (1) being from about 0.5:1 to about 100:1.

22. The process of polymerizing styrene which comprises polymerizing styrene with a catalytic amount of a two-component catalyst composition comprising (1) the hydrocarbon-insoluble reaction product separated from the hydrocarbon-soluble products of the reaction of titanium tetrachloride with an alkylaluminum halide in a molar ratio of from about 1:0.1 to about 1:100, and (2) a trialkylaluminum, said catalyst component (1) being present in an amount of from about 0.1 to about 1000 millimoles per mole of styrene, and the ratio of the catalyst component (2) to catalyst component (1) being from about 0.5:1 to about 100:1.

23. The process of polymerizing ethylene which comprises polymerizing ethylene with a catalytic amount of a two-component catalyst composition comprising (1) the hydrocarbon-insoluble reaction product separated from the hydrocarbon-soluble products of the reaction of titanium tetrachloride with an alkylaluminum halide in a molar ratio of from about 1:0.1 to about 1:100, and (2) an alkylaluminum compound, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

24. The process of polymerizing propylene which comprises polymerizing propylene with a catalytic amount of a two-component catalyst composition comprising (1) the hydrocarbon-insoluble reaction product separated from the hydrocarbon-soluble products of the reaction of titanium tetrachloride with an alkyl aluminum halide in a molar ratio of from about 1:0.1 to about 1:100, and (2) a trialkylaluminum, said catalyst component (1) being present in an amount of from about 0.1 to about 1000 millimoles per mole of ethylenically unsaturated hydrocarbon and the ratio of catalyst component (2) to catalyst component (1) being from about 0.05:1 to about 100:1.

25. A process of ethylene polymerization which comprises contacting ethylene with a two-component catalyst, the first component being obtained by reacting titanium tetrachloride with an alkyl aluminum chloride containing 1–4 carbon atoms in the alkyl radical at a temperature of 0–120° C. in an inert hydrocarbon reaction medium to obtain a hydrocarbon-insoluble reaction product, separating said hydrocarbon-insoluble reaction product and washing it with an inert hydrocarbon, the second component being an alkyl aluminum chloride containing 1–4 carbon atoms in the alkyl radicals and continuing to polymerize until polyethylene separates in the form of a slurry.

26. The process of polymerizing propylene which comprises polymerizing propylene with a catalytic amount of a two-component catalyst composition comprising (1) the hydrocarbon-insoluble reaction product separated from the hydrocarbon-soluble products of the reaction of titanium tetrachloride with an alkylaluminum compound in a molar ratio of from about 1:0.1 to about 1:100 and (2) an alkylaluminum halide, said catalyst component (1) being present in an amount of from about 0.1 to about 1000 millimoles per mole of propylene and the ratio of catalyst component (2) to catalyst component (1) being from about 0.05:1 to about 100:1.

References Cited in the file of this patent
UNITED STATES PATENTS

| | | |
|---|---|---|
| 2,699,457 | Ziegler et al. | Jan. 11, 1955 |
| 2,721,189 | Anderson | Oct. 18, 1955 |
| 2,822,357 | Brebner et al. | Feb. 4, 1958 |
| 2,839,518 | Brebner | June 17, 1958 |
| 2,862,917 | Anderson et al. | Dec. 2, 1958 |
| 2,905,645 | Anderson et al. | Sept. 22, 1959 |

UNITED STATES PATENT OFFICE
CERTIFICATE OF CORRECTION

Patent No. 3,058,963          October 16, 1962

Edwin J. Vandenberg

It is hereby certified that error appears in the above numbered patent requiring correction and that the said Letters Patent should read as corrected below.

Columns 11 and 12, TABLE V, under the heading "Organometallic catalyst component", line 14 thereof, for "Al($C_2$Hl)$_3$" read -- Al($C_2H_5$)$_3$ --; column 13, line 63, for "meals" read -- metals --.

Signed and sealed this 19th day of March 1963.

(SEAL)

Attest:

ESTON G. JOHNSON

Attesting Officer

DAVID L. LADD

Commissioner of Patents